United States Patent
Thubert et al.

(10) Patent No.: US 9,621,581 B2
(45) Date of Patent: Apr. 11, 2017

(54) IPV6/IPV4 RESOLUTION-LESS FORWARDING UP TO A DESTINATION

(71) Applicant: Cisco Technology, Inc., San Jose, CA (US)

(72) Inventors: Pascal Thubert, La Colle sur Loup (FR); Christophe Benejean, Biot (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 724 days.

(21) Appl. No.: 13/839,259

(22) Filed: Mar. 15, 2013

(65) Prior Publication Data

US 2014/0269717 A1    Sep. 18, 2014

(51) Int. Cl.
| | |
|---|---|
| H04L 29/06 | (2006.01) |
| H04L 12/935 | (2013.01) |
| H04L 12/931 | (2013.01) |
| H04L 12/761 | (2013.01) |
| H04L 29/12 | (2006.01) |
| H04L 12/721 | (2013.01) |
| H04L 12/743 | (2013.01) |

(52) U.S. Cl.
CPC .......... *H04L 63/1458* (2013.01); *H04L 45/16* (2013.01); *H04L 49/201* (2013.01); *H04L 49/3009* (2013.01); *H04L 61/103* (2013.01); *H04L 63/1416* (2013.01); *H04L 45/66* (2013.01); *H04L 45/7457* (2013.01)

(58) Field of Classification Search
CPC .. H04L 61/103; H04L 63/1458; H04L 49/201
USPC ......................................................... 370/392
See application file for complete search history.

(56) References Cited

U.S. PATENT DOCUMENTS

| | | | | |
|---|---|---|---|---|
| 6,085,328 A | * | 7/2000 | Klein | G06F 1/3209 709/227 |
| 6,711,172 B1 | * | 3/2004 | Li | H04L 12/1836 370/401 |

(Continued)

OTHER PUBLICATIONS

Bi, et al., "SAVI Solution for DHCP", draft-ietf-savi-dhcp-15, IETF, SAVI Internet Draft, Sep. 2012, 36 pages.

(Continued)

*Primary Examiner* — Christopher Crutchfield
(74) *Attorney, Agent, or Firm* — Parker Ibrahim & Berg LLC; James M. Behmke; Stephen D. LeBarron

(57) ABSTRACT

In one embodiment, a switch in a computer network intercepts a packet to a destination target, the packet having a solicited node multicast address of the target as a destination media access control (MAC) address of the packet. As such, the switch may determine whether the solicited node multicast address is a hit or miss within a switch hardware table of the switch, and in response to a hit, re-writes the destination MAC address with a known value of the destination target from the table, and unicasts the packet to the destination target. In one or more additional embodiments, in response to a miss, and in response to a single-switch architecture, the switch drops the packet, while in response to a miss, and in response to a multi-switch architecture, the switch may compute a repository switch for the solicited multicast destination, and unicasts the packet to the computed repository switch.

20 Claims, 11 Drawing Sheets

(56) References Cited

U.S. PATENT DOCUMENTS

| | | | |
|---|---|---|---|
| 6,732,182 B1* | 5/2004 | Beverly, IV | H04L 12/18 370/244 |
| 7,855,950 B2 | 12/2010 | Zwiebel et al. | |
| 7,889,754 B2 | 2/2011 | Dec et al. | |
| 8,169,924 B2 | 5/2012 | Sajassi et al. | |
| 8,259,569 B2 | 9/2012 | Banerjee et al. | |
| 2005/0128975 A1* | 6/2005 | Kobayashi | H04W 8/04 370/328 |
| 2005/0265360 A1* | 12/2005 | Kim | H04L 12/2854 370/400 |
| 2005/0271015 A1* | 12/2005 | Nishida | H04W 36/0011 370/331 |
| 2006/0184663 A1* | 8/2006 | Takahashi | H04L 12/185 709/224 |
| 2006/0234636 A1* | 10/2006 | Miller et al. | 455/67.11 |
| 2008/0175251 A1* | 7/2008 | Oouchi | H04L 45/04 370/395.31 |
| 2008/0320154 A1* | 12/2008 | Demmer | H04W 4/02 709/229 |
| 2008/0320165 A1* | 12/2008 | Jeon | H04L 45/16 709/242 |
| 2010/0157795 A1* | 6/2010 | Konishi et al. | 370/230 |
| 2010/0241744 A1* | 9/2010 | Fujiwara | H04L 12/2602 709/224 |
| 2012/0166798 A1* | 6/2012 | Perez | H04L 61/2092 713/168 |
| 2012/0275347 A1 | 11/2012 | Banerjee et al. | |
| 2012/0287930 A1* | 11/2012 | Raman | H04L 45/02 370/392 |
| 2012/0331542 A1* | 12/2012 | Halpern | 726/13 |
| 2013/0021942 A1 | 1/2013 | Bacthu et al. | |
| 2013/0089093 A1 | 4/2013 | Bacthu et al. | |
| 2013/0100851 A1 | 4/2013 | Bacthu et al. | |
| 2013/0195109 A1* | 8/2013 | Ogawa | 370/392 |
| 2014/0016457 A1* | 1/2014 | Enyedi | H04L 45/16 370/225 |
| 2014/0254589 A1* | 9/2014 | Kapadia | H04L 12/1881 370/390 |

OTHER PUBLICATIONS

Nordmark, et al., "FCFS SAVI: First-Come First-Serve Source-Address Validation for Locally Assigned IPv6 Addresses", RFC 6620, IETF Task Force Trust, May 2012, 35 pages.

* cited by examiner

US 9,621,581 B2

IPV6/IPV4 RESOLUTION-LESS FORWARDING UP TO A DESTINATION

TECHNICAL FIELD

The present disclosure relates generally to computer networks, and, more particularly, to resolution-less forwarding within computer networks.

BACKGROUND

Address Resolution (AR) does not scale very well in very large layer-2 domains, such as massive datacenters, and is very much prone to Denial of Service (DoS) attacks (such as prefix scanning). Basically, when the last router finds that the destination is "on-link", and it has no adjacency (no physical address) for it, the router builds and broadcasts (Address Resolution Protocol, "ARP" in (Internet Protocol version 4, "IPv4") or multicasts (Neighbor Discovery (ND)/Neighbor Solicitation (NS) in IPv6) a resolution packet. This packet is transmitted by all switches of the layer-2 domain, and spread to every node. Only one at most responds: the one that owns the destination (target). When multiplied by a very large number, the AR operations represent a significant overhead for the router, the switches, the links (especially the wireless), and the hosts themselves.

In addition, a classical attack is a malicious remote user scanning a prefix by sending a lot of packets to all possible (most if not all invalid) destinations, within that prefix, at a high rate. The last router (owning that prefix) attempts to resolve each destination, and consumes resources up the point where it is no longer able to resolve valid destinations.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a switch in a computer network intercepts a packet to a destination target, the packet having a solicited node multicast address of the target as a destination media access control (MAC) address of the packet. As such, the switch may determine whether the solicited node multicast address is a hit or miss within a switch hardware table of the switch, and in response to a hit, re-writes the destination MAC address with a known value of the destination target from the table, and unicasts the packet to the destination target. Notably, in one or more additional embodiments, in response to a miss, and in response to a single-switch architecture, the switch drops the packet, while in response to a miss, and in response to a multi-switch architecture, the switch may compute a repository switch for the solicited multicast destination, and unicasts the packet to the computed repository switch.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 1:
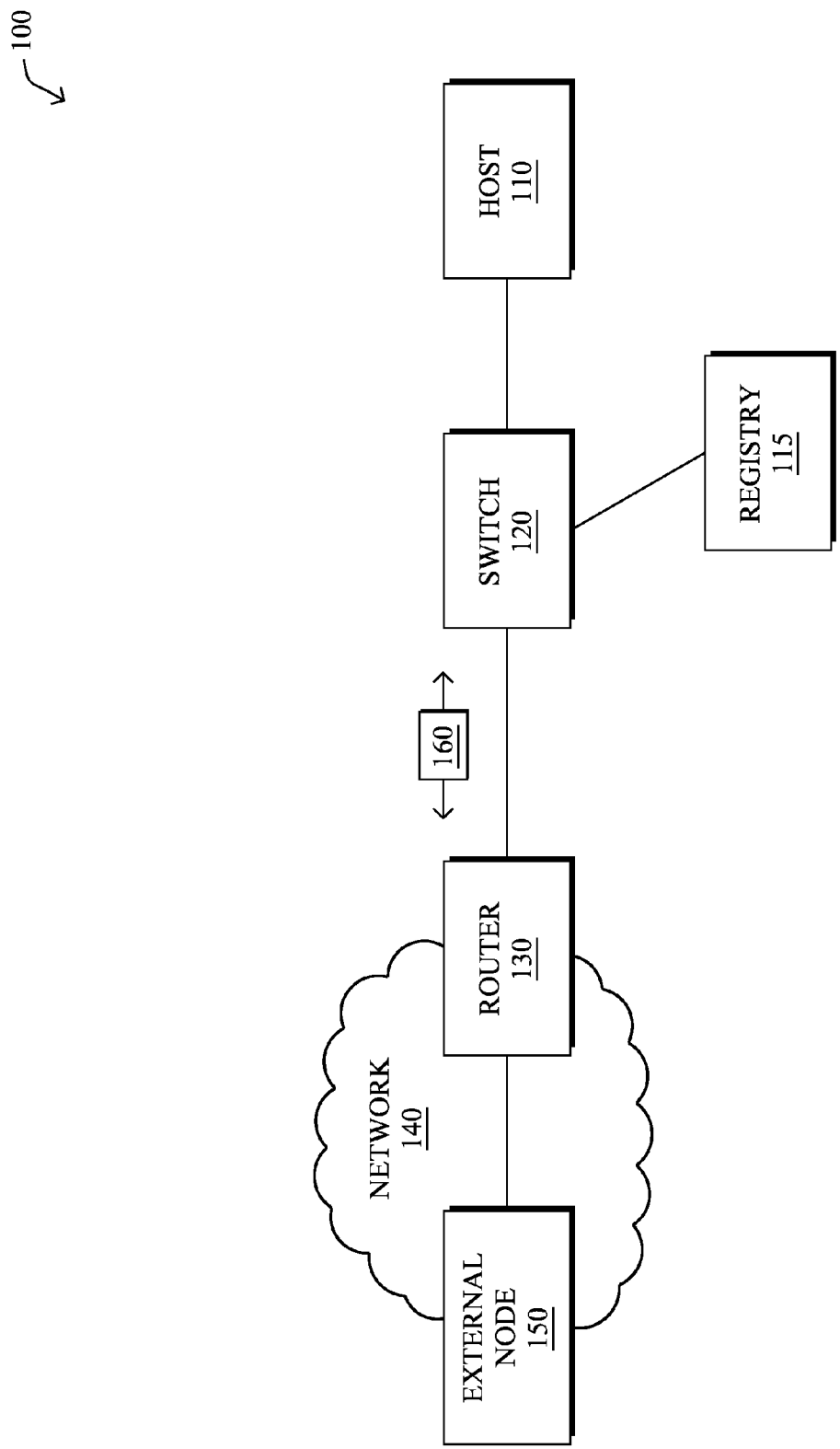
FIG. 1 illustrates an example communication network.

FIG. 1 is a schematic block diagram of an example computer network 100 illustratively comprising nodes/devices 200 such as one or more client devices (e.g., hosts or target nodes 110) interconnected via a switch 120 to a router 130 of a network (e.g., WAN) 140. Note that in certain embodiments, a registry device 115 may also be interconnected with the switch 120, as described herein. In addition, an external node 150 may be located outside of the target node's local network (e.g., between router 130 and target node 110). The links between devices may be wired links or shared media (e.g., wireless links, PLC links, etc.) where certain nodes 200 may be in communication with other nodes 200 (e.g., based on physical connection configuration) current operational status, distance, signal strength location, etc. Those skilled in the art will understand that any number of nodes, devices, links, etc. may be used in the computer network, and that the view shown herein is for simplicity.

Data packets 160 (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Figure 2:
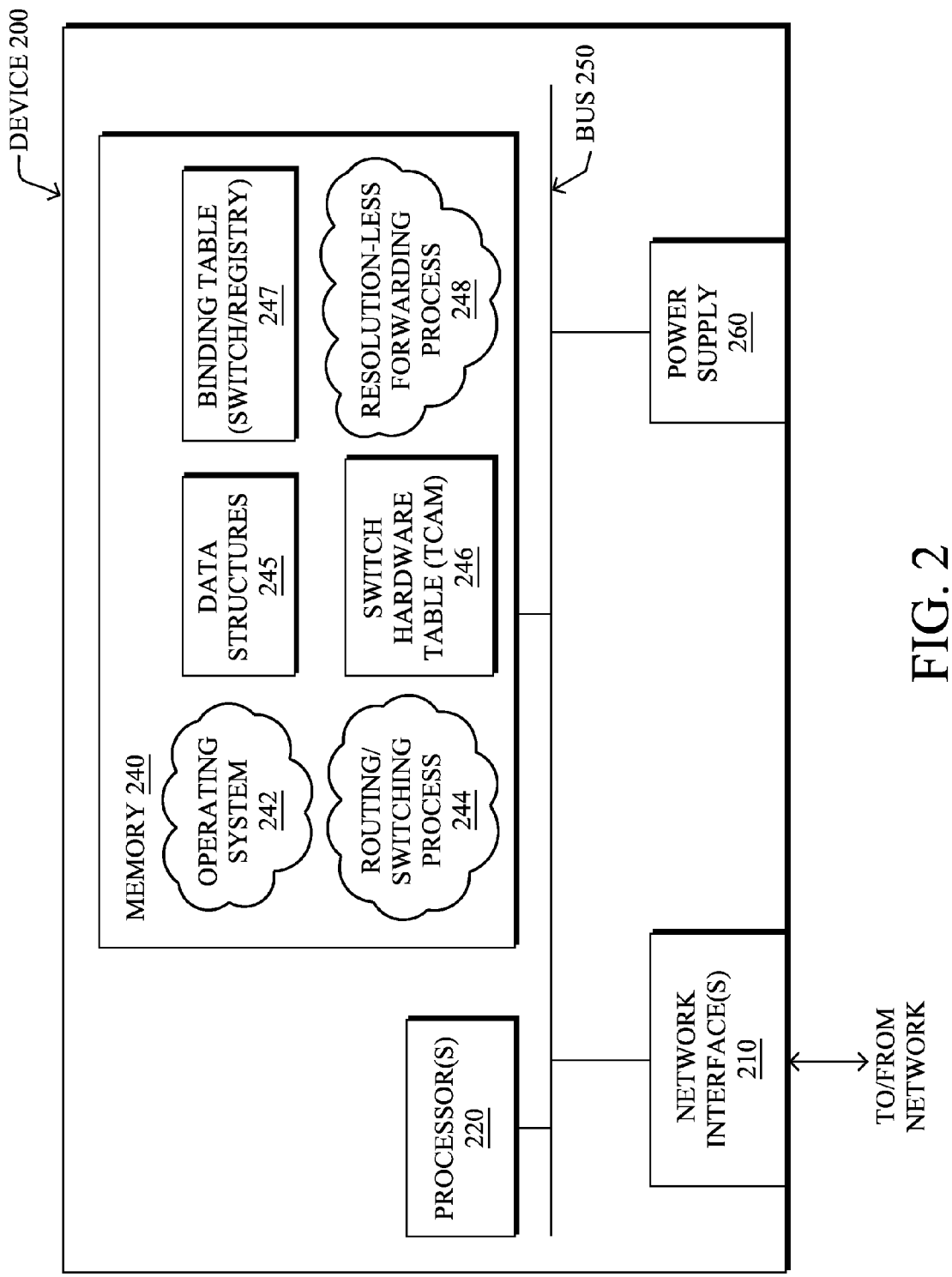
FIG. 2 illustrates an example network device/node.

FIG. 2 is a schematic block diagram of an example node/device 200 that may be used with one or more embodiments described herein, e.g., as any of the devices shown in FIG. 1 above, particularly a router, a switch, and/or a registry device 115, as described below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245, such as a switch hardware table (ternary content addressable memory, TCAM) 246 (on a router 130) or a binding table/registry 247 (on a switch 120 or registry 115, respectively). An operating system 242, portions of which are typically resident in memory 240 and executed by the processor, functionally organizes the device by, inter alia, invoking operations in support of software processes and/or services executing on the device. These software processes and/or services may comprise an illustrative routing/switching process 244 (e.g., for a router or switch, respectively), as well as an illustrative resolution-less forwarding process 248. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, Address Resolution (AR) does not scale very well in very large layer-2 domains, such as massive datacenters, and is very much prone to Denial of Service (DoS) attacks (such as prefix scanning). Basically, when the last router finds that the destination is "on-link", and it has no adjacency (no physical address) for it, the router builds and broadcasts (Address Resolution Protocol, "ARP" in (Internet Protocol version 4, "IPv4") or multicasts (Neighbor Discovery (ND)/Neighbor Solicitation (NS) in IPv6) a resolution packet. This packet is transmitted by all switches of the layer-2 domain, and spread to every node. Only one at most responds: the one that owns the destination (target). When multiplied by a very large number, the AR operations represent a significant overhead for the router, the switches, the links (especially the wireless), and the hosts themselves.

In addition, a classical attack is a malicious remote user scanning a prefix by sending a lot of packets to all possible (most if not all invalid) destinations, within that prefix, at a high rate. The last router (owning that prefix) attempts to resolve each destination, and consumes resources up the point where it is no longer able to resolve valid destinations.

Several solutions have been proposed to improve the AR process, such as throttling the AR requests, which prevents the router to run out of resources but can't distinguish between good and bogus resolutions attempts and does not help to scale AR. Another proposed solution uses a "destination guard" that bases the AR decision on the binding table (a list of existing destination addresses available on the layer-2 domain). The destination guard operates in two modes:

i) If the binding table is co-located with the router, it drops AR for unknown destinations while performing resolutions for the known one.

ii) If the binding table is not co-located, it issues an AR message (ARP or NS) toward the first switch that has the binding table, but does not create any state in its cache. The switch lookup the binding table and on HIT (locating the entry within the table), then it responds to the router. Otherwise, it drops the AR request. This is referred to as "stateless resolution".

With any of these solutions, the router is still required to attempt to resolve the destination, which consumes processing resources and can overwhelm the router if there is an attack.

The techniques herein, on the other hand, provide for Address Resolution to become proactive instead of reactive. The binding table (centralized or distributed across the 12-switches of the layer-2 domain) is downloaded into the switch hardware table, and packets entering the layer-2 domain, that would normally require an Address Resolution, are in fact forwarded to the switch that knows the binding (address, MAC) and that performs a MAC rewrite. The packet can then reach its destination without any Address Resolution taking place.

Specifically, according to one or more embodiments of the disclosure as described in detail below, a switch in a computer network intercepts a packet to a destination target, the packet having a solicited node multicast address of the target as a destination media access control (MAC) address of the packet. As such, the switch may determine whether the solicited node multicast address is a hit or miss within a switch hardware table of the switch, and in response to a hit, re-writes the destination MAC address with a known value of the destination target from the table, and unicasts the packet to the destination target. Notably, in one or more additional embodiments, in response to a miss, and in response to a single-switch architecture, the switch drops the packet, while in response to a miss, and in response to a multi-switch architecture, the switch may compute a repository switch for the solicited multicast destination, and unicasts the packet to the computed repository switch.

Illustratively, the techniques described herein may be performed by hardware, software, and/or firmware, such as in accordance with the illustrative resolution-less forwarding process 248, which may each contain computer executable instructions executed by the processor 220 to perform functions relating to the techniques described herein, e.g., in conjunction with (e.g., as a component of) routing/switching process 244. For example, the techniques herein may be treated as extensions to conventional Address Resolution protocols, and as such, may be processed by similar components understood in the art that execute those protocols on the specific device (e.g., router 140, switch 120, or even registrar 115) performing the action being described, accordingly. For instance, certain standards and/or protocols have been proposed by the Source Address Validation Improvements (SAVI) Working Group at the Internet Engineering Task Force (IETF), such as "SAVI Solution for DHCP"<draft-ietf-savi-dhcp-15>, by J. Bi et al. (Sep. 11, 2012 edition), and Request for Comment (RFC) 6620, "FCFS SAVI: First-Come First-Serve Source-Address Validation Improvement for Locally Assigned IPv6 Addresses", by Erik Nordmark et al. (May 2012), the contents of each being incorporated by reference in their entirety herein.

Operationally, the proposed solution can be referred to as "resolution-less" forwarding, where the binding table still plays a significant role, but the ND resolution is completely bypassed. The techniques assume that conventional snooping operations (as will be understood by those skilled in the art) still take place in the layer-2 domain and that the set of switches in the domain contain an accurate list of all available destinations. These destinations are available at the hardware-switching table (tcam) 246, so that ultra-fast decisions can be made based on a destination hit or miss. In short, switches don't need to resolve: they already have the physical location of every single destination, through ND and/or Dynamic Host Configuration Protocol (DHCP) snooping.

According to the techniques herein, when the router does not have an adjacency for a destination, instead of kicking off a computationally expensive AR process, that involves packet queuing, starting timers, building AR requests, etc., the embodiments herein just rewrite the destination media access control (MAC) address to the solicited node multicast (SNM) address of the target, and forwards the packet as any other packet (i.e., the output interface is known since the address is "on-link").

Figure 3:
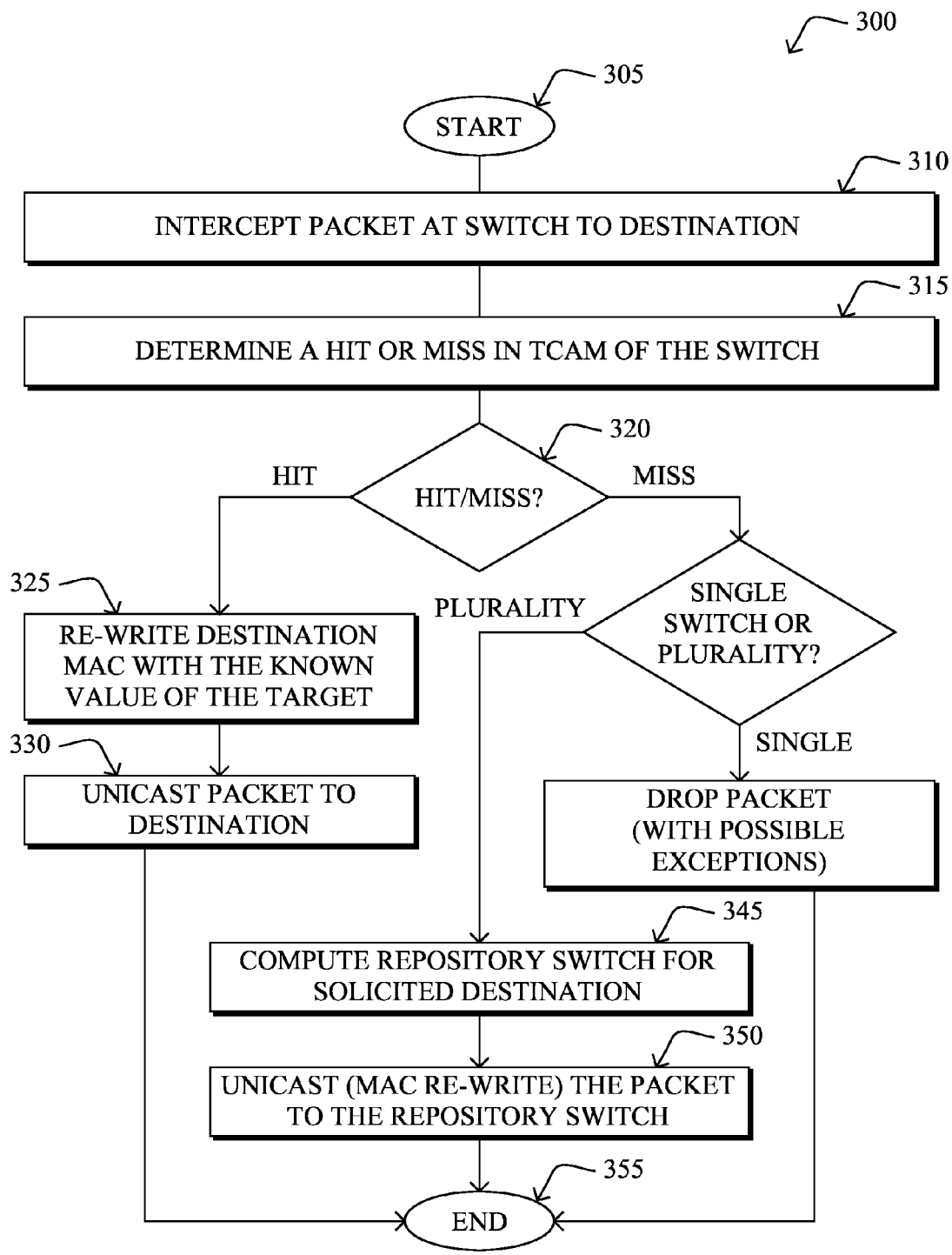
FIG. 3 illustrates an example simplified procedure for resolution-less forwarding.

FIG. 3 illustrates an example simplified procedure 300 for resolution-less forwarding in accordance with one or more embodiments described herein. The procedure 300 may start at step 305, and continues to step 310, where, as illustrated below, a first switch intercepts a packet (e.g., "hardware intercepts") to a destination, and processes it based on determining a hit or miss of the destination in tcam of the switch in step 315. If in step 320 it is determined that the entry is in the tcam (HIT), then in step 325 the switch re-writes the destination MAC with the known value of the target (host) and the packet is unicast to the destination in step 330.

If the entry is not in the tcam (MISS), then in step 335 the decision is made whether there is a single switch architecture or a plurality of switches (with a distributed binding table). If the setup involves a single switch, then in step 340 the packet can be safely dropped since the destination is bogus, i.e., no addressing flow took place for it that the switch could snoop. (Note that there is a background recovery mechanism that can handle exceptions if needed.) If the entry is not in the tcam (MISS), and the setup involve several switches with a distributed binding table, then the switch computes the repository (registrar or rendezvous (RDV) point) switch for that solicited destination in step 345 (e.g., by hashing the destination MAC of the multicast-solicited address), and unicasts (another MAC rewrite) the packet to that repository switch. The procedure for the forwarding switch may then end at step 355, and once at the RDV point, the procedure returns to step 310 to intercept and process the packet, accordingly.

Notably, resolution need not take place in any of the scenarios above, hence referring to the solution as resolution-less forwarding. In addition, the router is completely protected as it does not perform any resolution, and the first packet is going to reach the destination, when it is valid, whether operating in IPv4 or IPv6 (as opposed to dropping the first packet during the resolution process in IPv4 as will be appreciated by those skilled in the art). Moreover, according to the techniques herein, the entire forwarding up to the destination involves no broadcast or multicast transmissions, allowing the techniques to scale well, even in the absence of a scanning attack.

Figure 4:
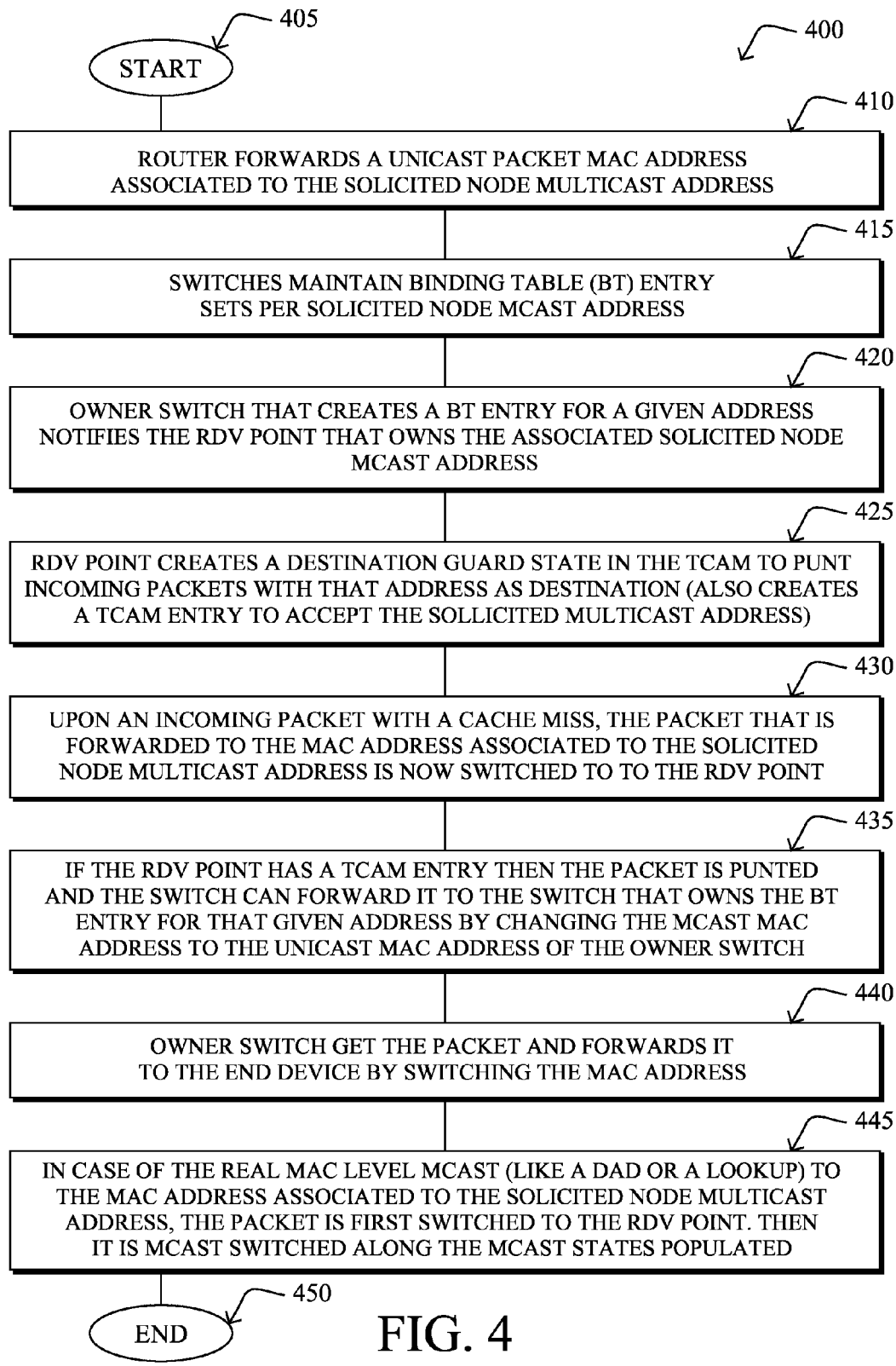
FIG. 4 illustrates another example simplified procedure for use with resolution-less forwarding.

FIG. 4 illustrates another example simplified procedure 400 for use with resolution-less forwarding in accordance with one or more embodiments described herein. The procedure 400 may start at step 405, and continues to step 410, where the router illustratively forwards a unicast IPv6 packet over to the MAC address associated to the solicited node multicast address. Note that this is acceptable over an Ethernet link or a small switch fabric where multicast and unicast have essentially the same cost. In step 415 the switches maintain binding table (BT) entry sets per solicited node multicast (SNM) address. Using a distributed hash table (DHT) technique, each switch can be responsible for a subset of the addressable world (e.g., 3-bytes). The switch that is responsible for a certain setting of the 3 bytes acts as a RDV Point for the associated multicast group.

In step 420, the owner switch that creates a BT entry for a given address (usually because the address is attached over an access link) notifies the RDV Point that owns the associated solicited node IPv6 multicast address, thus creating states in intermediate switches and in the RDV Point. Note that the intermediate switches can populate a table for switching the multicast MAC addresses. (The first switch may convert the multicast MAC to the unicast MAC of the RDV Point, but when this happens, the system wouldn't construct the RPF tree and wouldn't benefit from multicast operation.) In step 425, the RDV Point creates a destination guard state in the TCAM to punt incoming packets with that address as the destination. (The RDV point also creates a TCAM entry to accept the IPv6 solicited multicast address, such that it can obtain the real multicast and forward to the RPF tree.)

Upon receiving an incoming packet with a cache miss in step 430, the packet that is forwarded in step 410 to the MAC address associated to the solicited node multicast address is now switched to the RDV Point. (Note that this occurs because the multicast does not come from the spanning tree direction of the RDV Point). If the RDV Point has a TCAM entry, then in step 435 the packet is punted and the switch can forward the packet to the switch that owns the BT entry for that given address by changing the multicast MAC address to the unicast MAC address of the owner switch. As such, in step 440 the owner switch receives the packet and forwards it to the end device (host/target) by switching the MAC address again. In case of the real MAC level multicast (like a DAD or a lookup) to the MAC address associated to the solicited node multicast address, the packet is first switched to the RDV point in step 445, and then is multicast switched along the multicast states populated in step 420 (i.e., because this time the multicast comes from the spanning tree direction of the RDV Point). In step 450 the illustrative procedure 400 ends.

It should be noted that while certain steps within procedures 300-400 may be optional as described above, the steps shown in FIGS. 3-4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 300-400 are described separately, certain steps from each procedure may be incorporated into each other procedure, and the procedures are not meant to be mutually exclusive.

Notably, the techniques herein also add two instrumental mechanisms to function in a robust manner while in conjunction with current protocols (e.g., RFC 6620). For instance, the first is referred to as "device tracking", where the techniques keep track of the state of the devices on the link (on the VLAN) by polling them on a regular basis. So as soon as an address is learned (per RFC 6620), the techniques herein maintain an accurate tracking of its reachability. Also, as specified in 6620, the techniques herein may then distribute the states across the switches so that only one of the switches needs to maintain an (accurate) state of any given active host. The second mechanism allows a switch to efficiently query other switches (without ever reaching a host) about a state that it does not have. Furthermore, the techniques herein also propose a registrar (RDV point) as an indirection to the switch which owns the entry in its binding table (and TCAM), thus preventing a switch from having to query other switches, and allowing (valid) packets to flow to destinations through a purely switched path.

Accordingly, with these mechanisms, if an entry is active on the VLAN, it is guaranteed to be in one of the switch's binding table, in REACHABLE state. Also, when DHCP is used for address assignment, addresses are generally guaranteed to be known in one of the switches binding table. Further, the "data glean" component of RFC 6620 allows the discovery of addresses and bindings from a raw data packet. As such, if control messages were missed (that is possible for DAD), the binding can be extracted out of any data packet.

Figure 5:
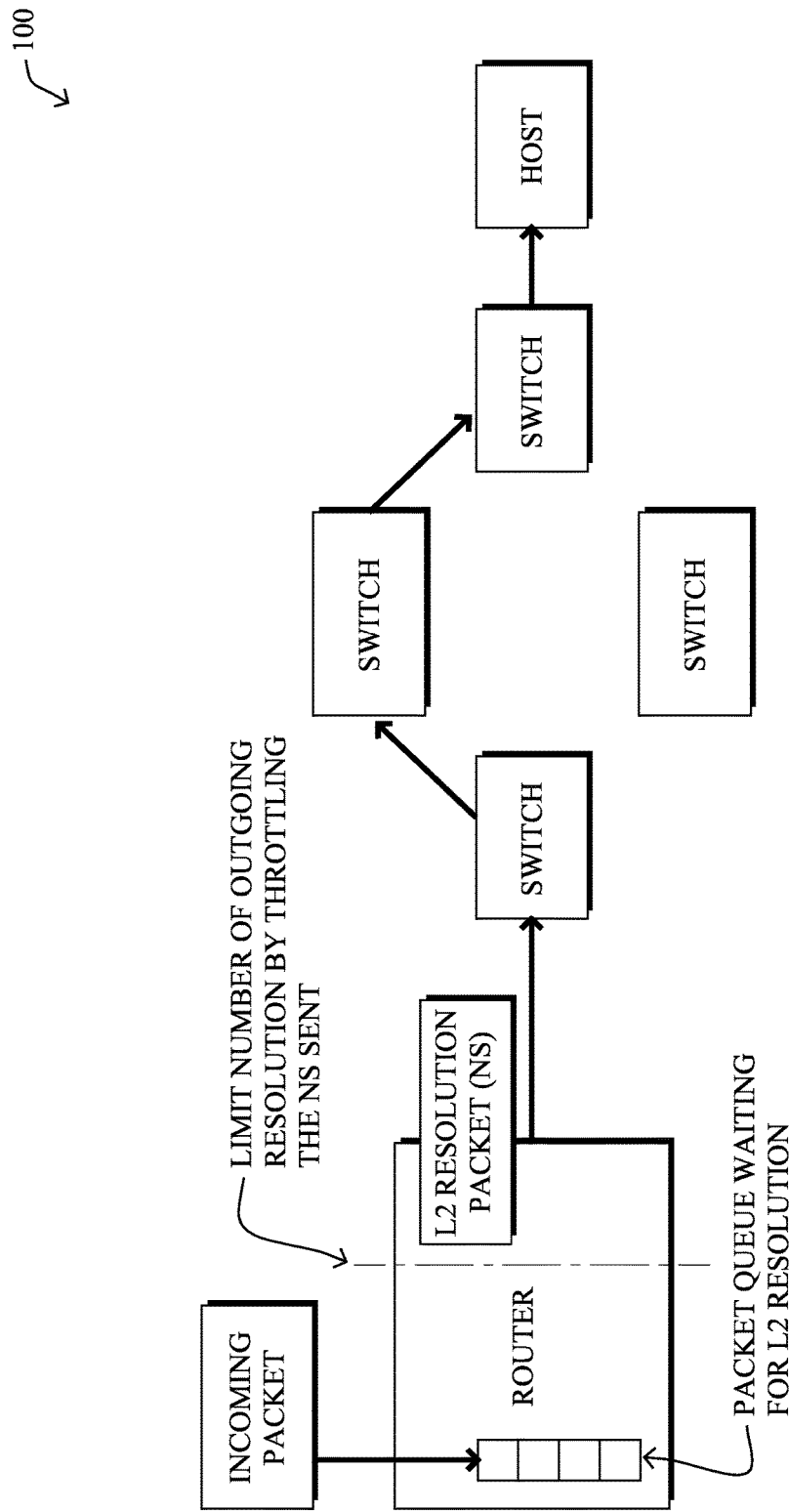
FIG. 5 illustrates an alternative view of the communication network of FIG. 1.
Figure 6:
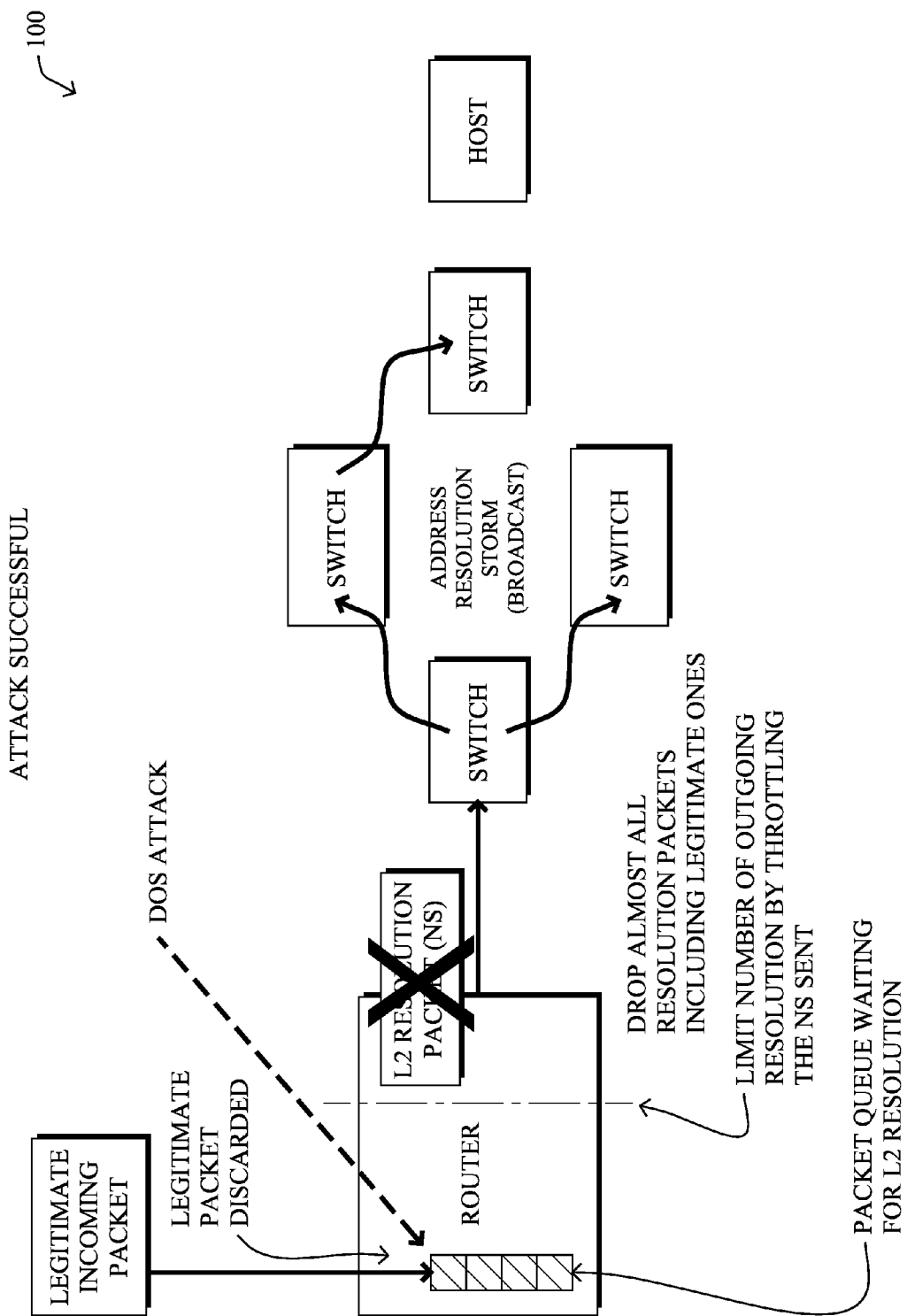
FIG. 6 illustrates an example of a Denial of Service (DoS) attack.

FIGS. 5-11 further illustrate the concept of resolution-less forwarding. In particular, FIG. 5 illustrates an alternative view of the network 100, where conventionally an incoming packet is received at a router and placed into its packet queue, waiting for L2 resolution. In general, the router may limit the number of outgoing resolutions by throttling the neighbor solicitation (NS) messages sent out (e.g., an L2 resolution packet) to a neighboring switch (e.g., of a plurality of switches). Also, FIG. 6 illustrates the current scenario of FIG. 5 when a DoS attack is initiated. As such, the packet queue of the router is overrun, and legitimate packets are discarded. The router drops almost all resolution packets, including legitimate ones, while an address resolution storm (broadcast) cripples the switches.

Figure 7:
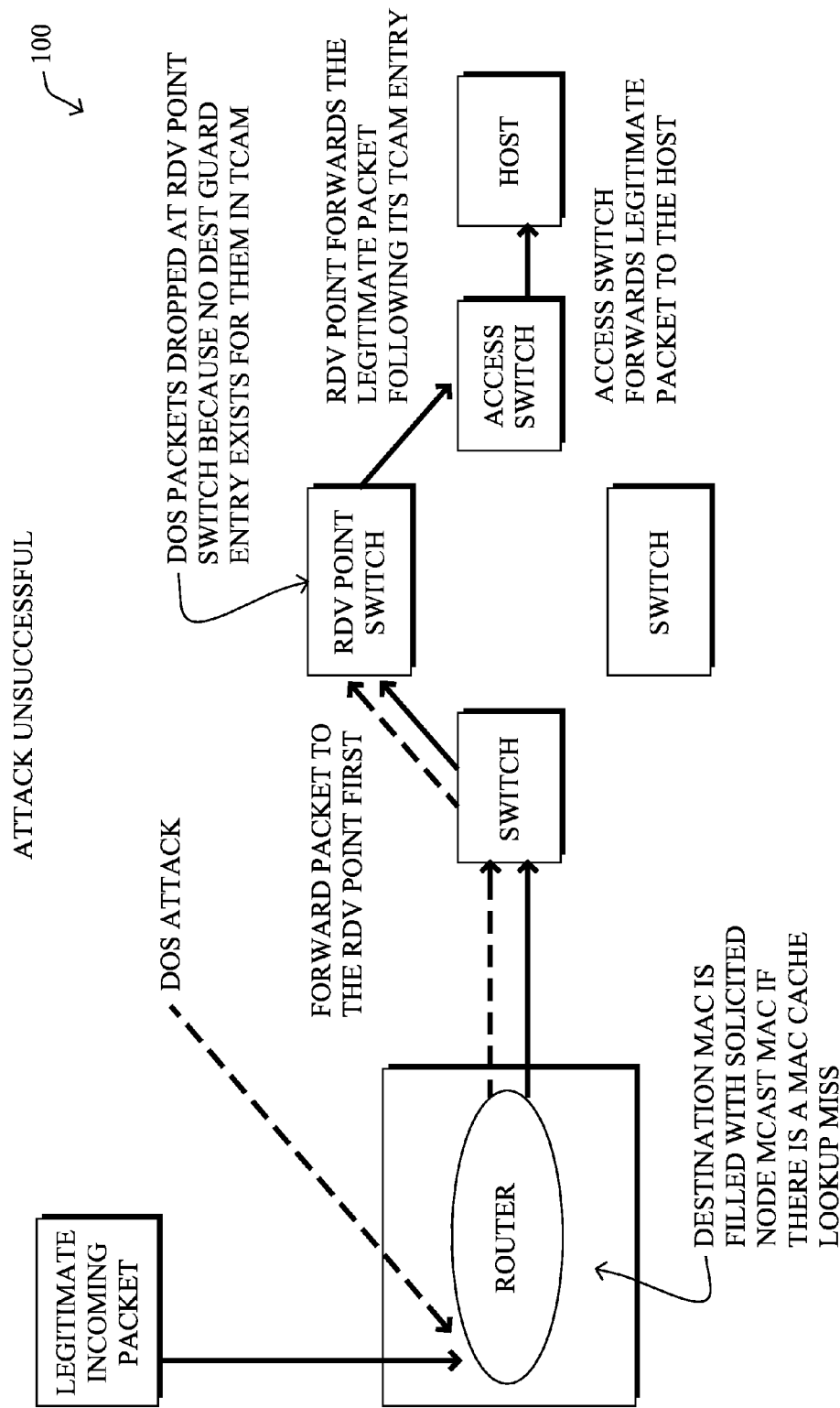
FIG. 7 illustrates an example of an unsuccessful DoS attack using resolution-less forwarding.

According to the techniques herein, with the network based Address Resolution as shown in FIG. 7, the DoS attack is rendered unsuccessful. In particular, the destination MAC is filled with a solicited node multicast MAC if there is a MAC cache lookup miss, and DoS packets are dropped at the RDV Point switch because no destination guard entry exists for them in TCAM. The RDV Point thus forwards the legitimate packet following its TCAM entry, and the access switch forwards the legitimate packet to the host.

Figure 8:
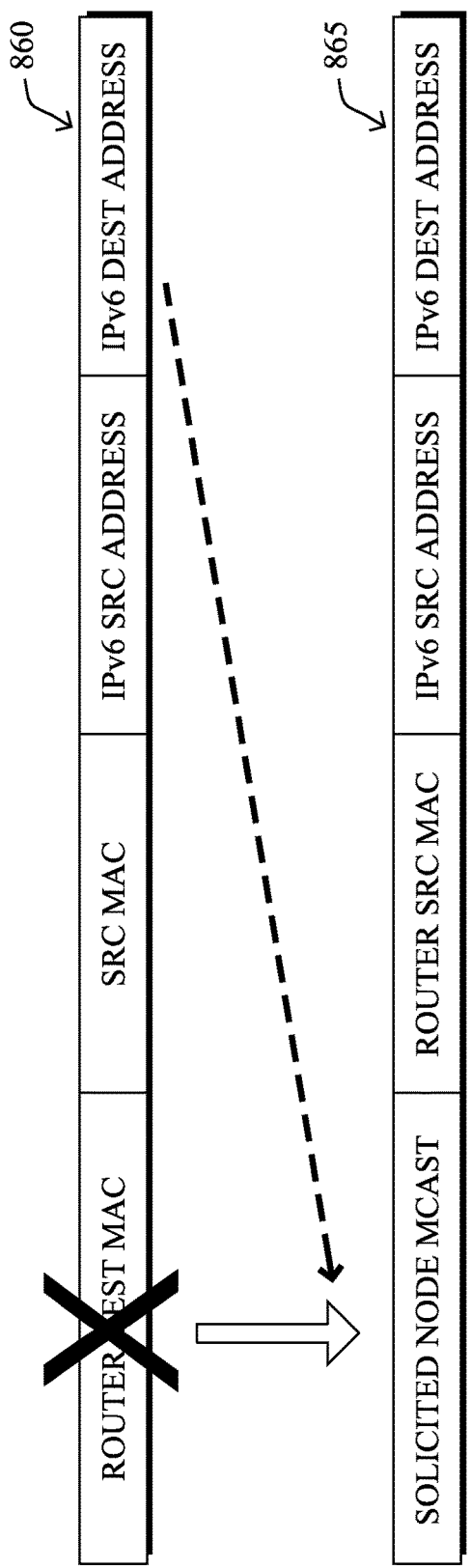
FIG. 8 illustrates an example of address switching within a packet.
Figure 9:
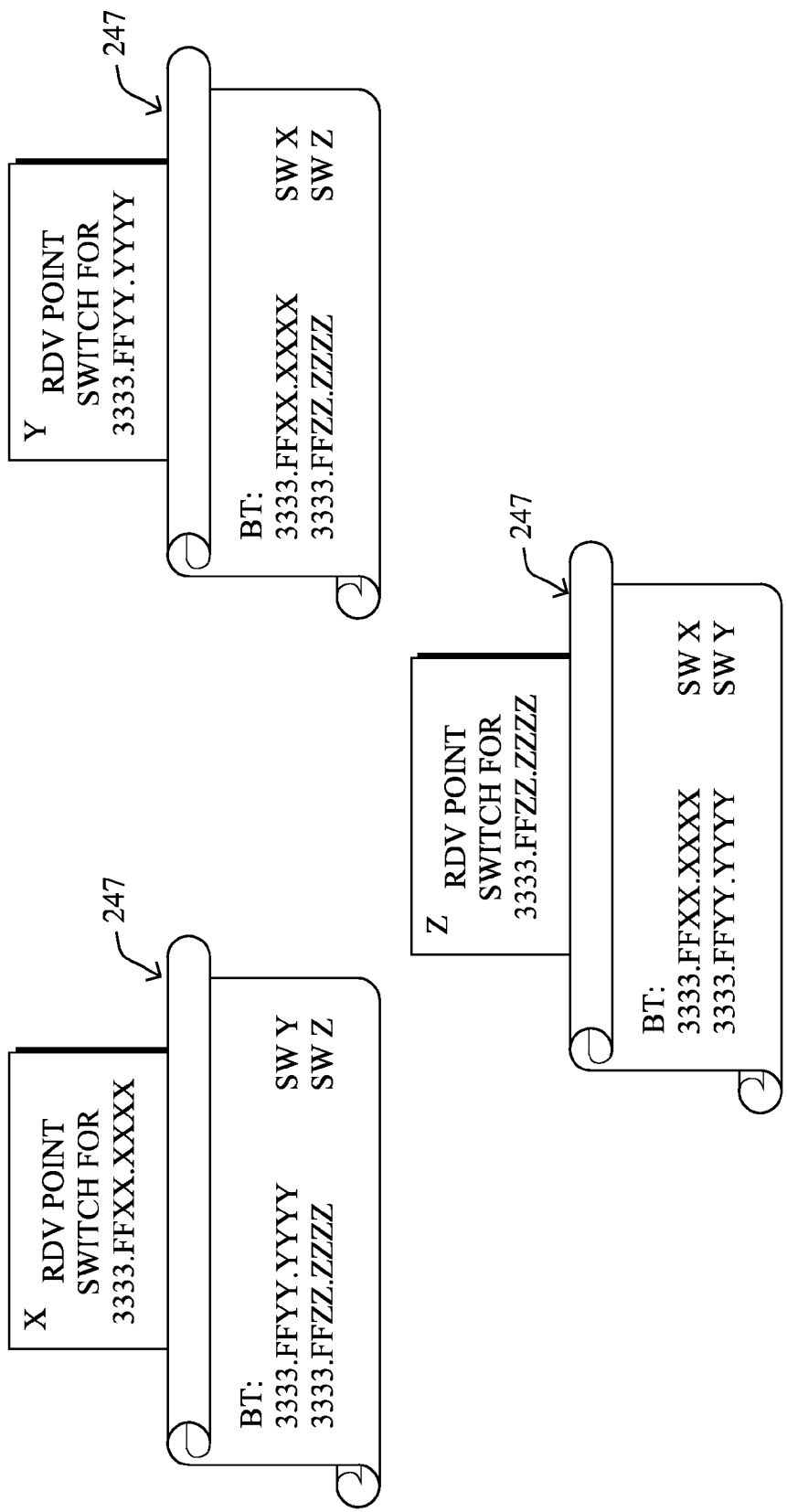
FIGS. 9-11 illustrate examples of address lookups in relation to resolution-less forwarding.

In general, the techniques herein illustratively involve four major steps. First, as shown in FIG. 8, at the router, when there is a ND cache lookup miss, the router takes the received packet 860, and sends a revised packet 865 to the LAN side with a solicited node multicast ("mcast") MAC address. Second, as shown in FIG. 9, the switches maintain binding table (BT) entry sets per solicited node multicast address. As noted above, using DHT techniques, each switch can be responsible for a subset of the 3-byte addressable world, where the switch that is responsible for a certain setting of the 3 bytes acts as a RDV Point for the associated multicast group.

Figure 10:
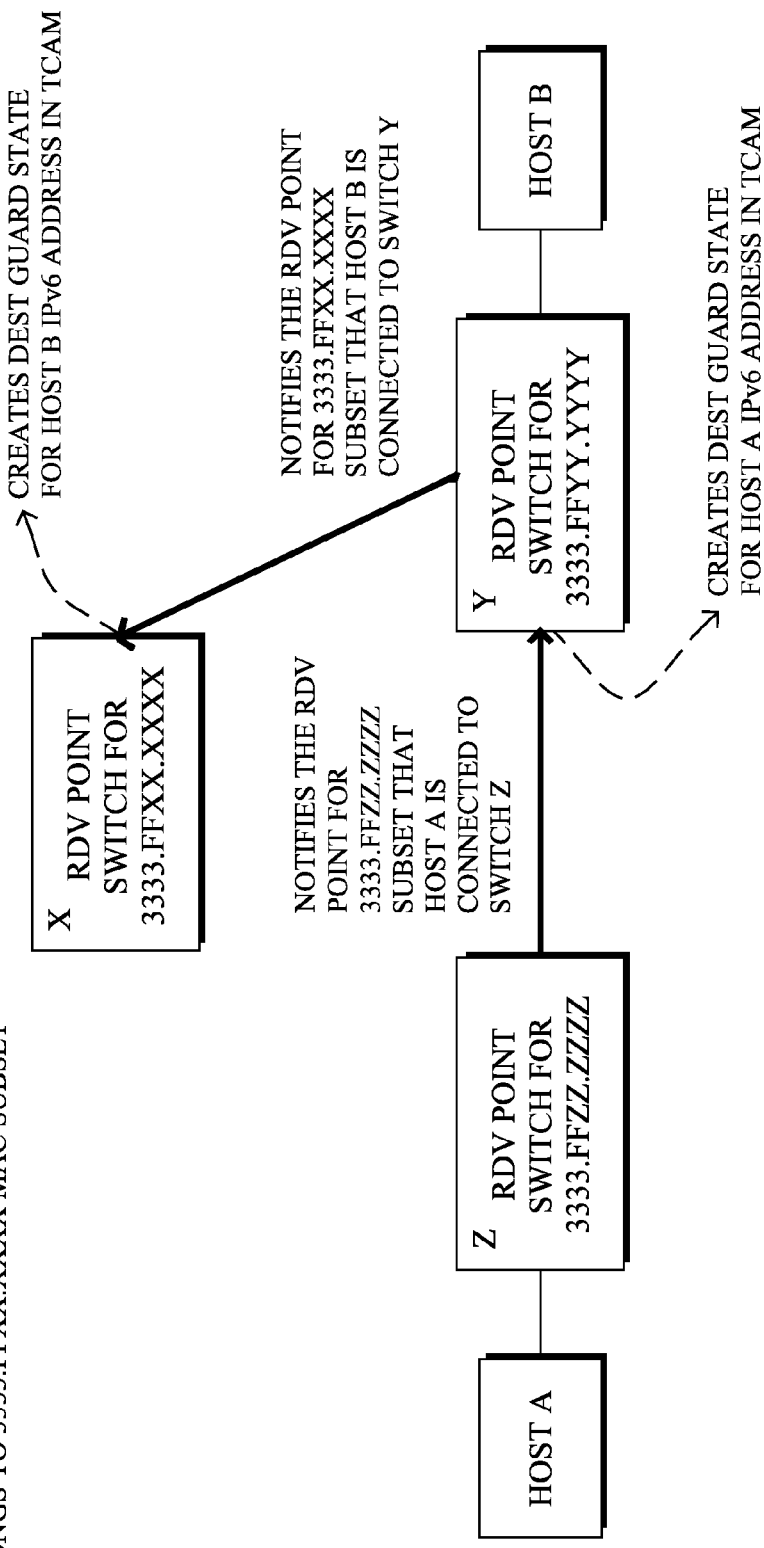

Third, as shown in FIG. 10, the owner switch that creates a BT entry for a given address (usually because the address is attached over an access link) notifies the RDV Point that owns the associated solicited node IPv6 multicast address. This creates states in intermediate switches and in the RDV Point. The intermediate switches can populate a table for switching the mcast MAC addresses. The RDV Point creates a destination guard state in the TCAM to punt incoming packets with that address as destination. For instance, as shown in FIG. 10, in the example Host A's solicited node multicast MAC belongs to the 3333.FFYY.YYYY MAC subset and Host B's solicited node multicast MAC belongs to 3333.FFXX.XXXX MAC subset. Switch Z notifies the RDV point for 3333.FFZZ.ZZZZ subset that Host A is connected to switch Z, and switch Y creates a destination guard state for Host A IPv6 address in TCAM. Switch Y then notifies the RDV point for 3333.FFXX.XXXX subset that Host B is connected to switch Y, and switch X creates a destination guard state for Host B IPv6 address in TCAM.

Figure 11:
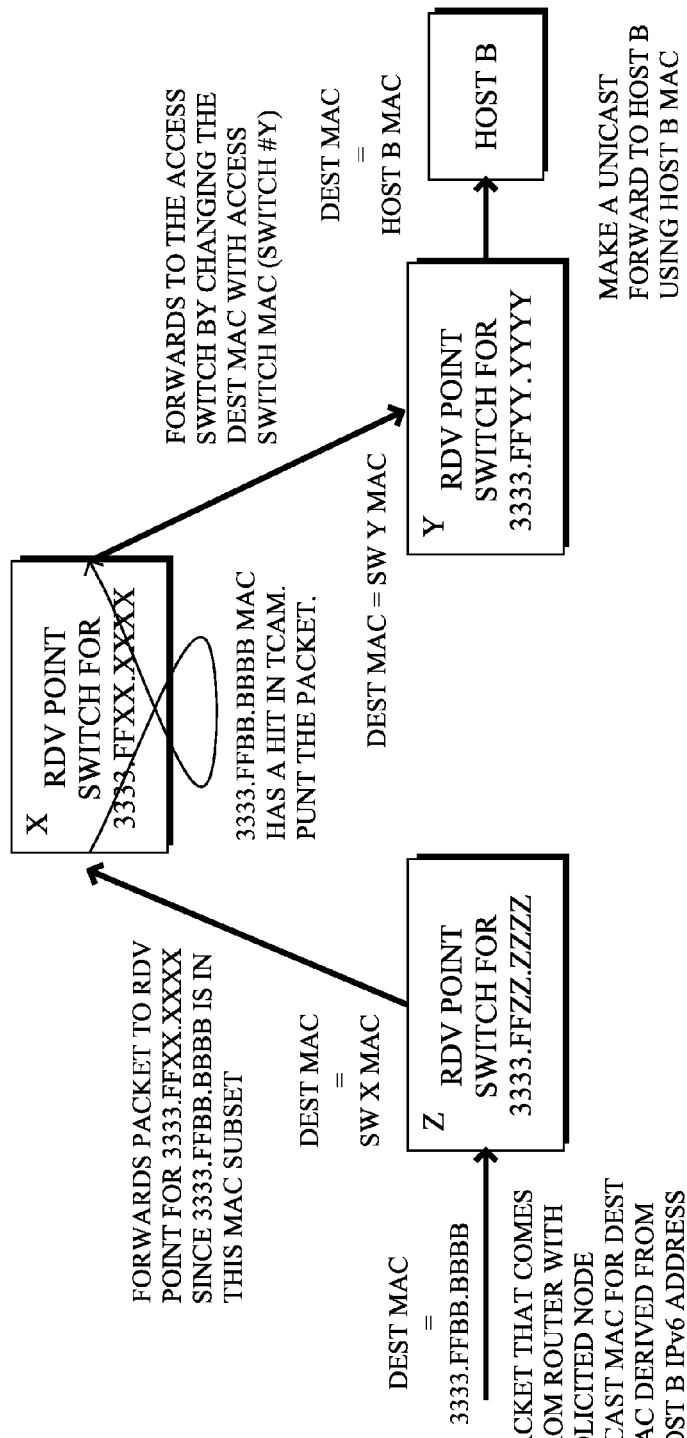

Fourth, as shown in FIG. 11, upon an incoming packet with a cache miss, the packet that is forwarded with the MAC address associated to the solicited node multicast address is now switched to the RDV Point. If the RDV Point has a TCAM entry then the packet is punted and the switch can forward it to the switch that owns the BT entry for that given address by changing the multicast MAC address to the unicast MAC address of the owner switch. For instance, in the example, assume that Host B's solicited node multicast MAC belongs to 3333.FFXX.XXXX MAC subset. Also, assume that a packet that comes from the router has a solicited node multicast MAC for a destination MAC derived from Host B's IPv6 address. Since the destination MAC equals the MAC of switch X, switch Z forwards the packet to the RDV Point for 3333.FFXX.XXXX since 3333.FFBB.BBBB is in this MAC subset. 3333.FFBB.BBBB MAC thus has a hit in the TCAM of switch X, so switch X punts the packet and forwards it to the access switch by changing the destination MAC with the access switch's MAC (switch Y). Switch Y then make a unicast packet and forwards it to Host B using Host B's MAC, accordingly. Note that the RDV Point Switch (X) may send a redirect message to the ingress switch (Z) telling it to send those packets directly to Access Switch (Y) for the next packets received.

The techniques described herein, therefore, provide for resolution-less forwarding in a computer network. In particular, the techniques herein can drop scanning attack (e.g., DoS attack) packets at wire speed, while at the same time ensuring that the first packet is never lost for a valid destination (IPv4 or IPv6) and saving the expensive AR process. In addition, the techniques significantly help scaling very large datacenters by removing the AR process, which may notably be enabled (or disabled) in response to administrator control or when the system (the edge router) detects a triggering event, such as an attack.

While there have been shown and described illustrative embodiments that provide resolution-less forwarding in a computer network, it is to be understood that various other adaptations and modifications may be made within the spirit and scope of the embodiments herein. For example, the embodiments have been shown and described herein with relation to particular conventional protocols (e.g., RFC 6620). However, the embodiments in their broader sense are not as limited, and may, in fact, be used with other suitable models and/or appropriate standards, including, but not limited to, future versions of the Internet Protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
intercepting, at a switch in a computer network, a packet originating from outside a layer 2 domain toward a destination target, the packet having a solicited node multicast address of the destination target as a destination media access control (MAC) address of the packet, wherein the solicited node multicast address is rewritten as the destination MAC in response to a router receiving the packet upon entry into the layer 2 domain not having adjacency for the destination target instead of performing address resolution for the packet;
determining whether the solicited node multicast address is a hit or miss within a switch hardware table of the switch;
in response to a hit, re-writing the destination MAC address with a known value of the destination target from the table; and
unicasting the packet to the destination target.

2. The method as in claim 1, further comprising:
in response to a miss, and in response to a single-switch architecture, dropping the packet.

3. The method as in claim 1, further comprising:
in response to a miss, and in response to a multi-switch architecture:
computing a repository switch for the solicited multicast destination; and
unicasting the packet to the computed repository switch.

4. The method as in claim 3, further comprising:
receiving, from the repository switch, a redirect message instructing the switch to send future packets directly to a given access switch.

5. The method as in claim 1, wherein the table is a ternary content addressable memory (TCAM).

6. The method as in claim 1, further comprising:
enabling the intercepting in response to administrator control.

7. The method as in claim 1, further comprising:
enabling the intercepting in response to detecting a triggering event.

8. The method as in claim 7, wherein the triggering event is an attack.

9. An apparatus, comprising:
one or more network interfaces to communicate as a switch in a computer network;
a processor coupled to the network interfaces and adapted to execute one or more processes; and
a memory configured to store a process executable by the processor, the process when executed operable to:
intercept a packet originating from outside a layer 2 domain toward a destination target, the packet having a solicited node multicast address of the destination target as a destination media access control (MAC) address of the packet, wherein the solicited node multicast address is rewritten as the destination MAC in response to a router receiving the packet upon entry into the layer 2 domain not having adjacency for the destination target instead of performing address resolution for the packet;
determine whether the solicited node multicast address is a hit or miss within a switch hardware table of the switch;
in response to a hit, re-write the destination MAC address with a known value of the destination target from the table; and
unicast the packet to the destination target.

10. The apparatus as in claim 9, wherein the process when executed is further operable to:
in response to a miss, and in response to a single-switch architecture, drop the packet.

11. The apparatus as in claim 9, wherein the process when executed is further operable to:
in response to a miss, and in response to a multi-switch architecture:
compute a repository switch for the solicited multicast destination; and
unicast the packet to the computed repository switch.

12. The apparatus as in claim 11, wherein the process when executed is further operable to:
receive, from the repository switch, a redirect message instructing the switch to send future packets directly to a given access switch.

13. The apparatus as in claim 9, wherein the table is a ternary content addressable memory (TCAM).

14. The apparatus as in claim 9, wherein the process when executed is further operable to:
enable the intercepting in response to administrator control.

15. The apparatus as in claim 9, wherein the process when executed is further operable to:
enable the intercepting in response to detecting a triggering event.

16. The apparatus as in claim 15, wherein the triggering event is an attack.

17. A tangible, non-transitory, computer-readable media having software encoded thereon, the software, when executed by a processor on a switch in a computer network, operable to:
intercept a packet originating from outside a layer 2 domain toward a destination target, the packet having a solicited node multicast address of the destination target as a destination media access control (MAC) address of the packet, wherein the solicited node multicast address is rewritten as the destination MAC in response to a router receiving the packet upon entry into the layer 2 domain not having adjacency for the destination target instead of performing address resolution for the packet;
determine whether the solicited node multicast address is a hit or miss within a switch hardware table of the switch;
in response to a hit, re-write the destination MAC address with a known value of the destination target from the table; and
unicast the packet to the destination target without any address resolution.

18. The computer-readable media as in claim 17, wherein the software when executed is further operable to:
in response to a miss, and in response to a single-switch architecture, drop the packet.

19. The computer-readable media as in claim 17, wherein the software when executed is further operable to:
in response to a miss, and in response to a multi-switch architecture:
compute a repository switch for the solicited multicast destination; and
unicast the packet to the computed repository switch.

20. The computer-readable media as in claim 17, wherein the software when executed is further operable to:
  receive, from the repository switch, a redirect message instructing the switch to send future packets directly to a given access switch.

* * * * *